(12) United States Patent
Huber et al.

(10) Patent No.: US 6,654,324 B1
(45) Date of Patent: Nov. 25, 2003

(54) ARCED FORMAT GENERATION METHOD AND SYSTEM

(75) Inventors: Gary D. Huber, Shoreview, MN (US); Gregory D. Hanson, Mounds View, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/523,638

(22) Filed: Mar. 13, 2000

(51) Int. Cl.⁷ .............................................. G11B 7/00
(52) U.S. Cl. ................... 369/47.28; 369/47.48
(58) Field of Search .................. 360/77.06, 97.08, 360/75, 48, 51, 53; 369/44.26, 275.3, 44.11, 47.28, 47.48

(56) References Cited

U.S. PATENT DOCUMENTS 6,034,831 A * 3/2000 Dobbek et al. .............. 360/53
6,204,989 B1 * 3/2001 Hrinya et al. ............ 360/77.06
6,304,407 B1 * 10/2001 Baker et al. .................. 360/75

* cited by examiner

*Primary Examiner*—Nabil Hindi
(74) *Attorney, Agent, or Firm*—Eric D. Levinson

(57) ABSTRACT

A process of writing sector header data in the form of a stream of digital bits producing features located at varying radial positions on a master recording disk. Synchronized with rotation of the disk, a variable delay having a duration which varies with the radial positions of the bits on the disk is introduced into a clock signal. In the preferred embodiment, using the clock signal, a highly accurate, variable time delay is generated between the rotation of a master recording spindle and the recording of sector header data on a master disk mounted on the spindle. Thus, optical disks manufactured from the master disk have arc-shaped sector header spokes exhibiting maximum spatial accuracy and resultant maximal timing accuracy.

23 Claims, 4 Drawing Sheets

ARCED FORMAT GENERATION METHOD AND SYSTEM

TECHNICAL FIELD

This invention concerns data recording media having embossed features, specifically methods and systems for manufacturing a master disk used to repeatedly replicate such features into mass-produced optical recording disks.

BACKGROUND

Certain formats for optical disks contain pre-embossed, arc-shaped sector header spokes, as opposed to the straight spokes commonly employed in commercially available optical disks. The shape of the arc is an important factor in the overall design of the data recording system, and therefore it must be formed as accurately as possible.

DISCLOSURE OF INVENTION

One aspect of the invention is a process of using a stream of digital bits to produce sector header data on a master recording disk. The header data is in the form of features that correspond to the digital bits. The features are located at varying radial positions on the disk. The process comprises synchronizing the stream of digital bits with rotation of the disk, while introducing between the stream and the rotation a variable delay. The variable delay has a duration that varies with the radial positions of the features on the disk. Thus, the features produced by the data stream form a curved spoke on the disk. The curved spoke can be any convenient shape.

Another aspect of the invention is a method of forming an arced sector header on a rotating master recording disk by using a clock signal. The method comprises introducing into the clock signal a variable delay that preserves the period of the clock signal. The method requires that the period of the clock signal be preserved. The delay may be longer than the period of the clock signal.

Yet another aspect of the invention is a method of using a data stream to form arced sector header shapes on rotating master recording disks. The method utilizes a clock signal having a variable delay that corresponds to a specific sector header shape. The delay preserves the period of the clock signal even though the delay time required to record the sector header may be longer than the period of the clock signal. The specific method comprises modulating a laser light beam by the data stream in response to an incoming data signal generated by a data source. A relative variation between the phase of the data stream and the rotational phase of the rotating master recording disk is created by the clock signal. One of such phases is held constant for each arced sector header shape.

Still another aspect of the invention is a system of forming an arced sector header on a rotating master recording disk. The system uses a data stream and a clock signal. The variable delay preserves the period of the clock signal, even though the delay time required to record the sector header may be longer than the period of the clock signal.

Still another aspect of the invention is a system for using a data stream to form arced sector header shapes on rotating master recording disks. The system uses a data stream having a phase, and the rotating master disk has a rotational phase. A clock signal has a variable delay that corresponds to a specific sector header shape. The system preserves the period of the clock signal, even though the delay time required to record the sector header may be longer than the period of the clock signal. The data stream modulates a laser light beam in response to an incoming data signal generated by a data source. There is a relative variation between the phase of the data stream and the rotational phase of the rotating master recording disk. The system requires that one of such phases is held constant.

DETAILED DESCRIPTION

Figure 1:
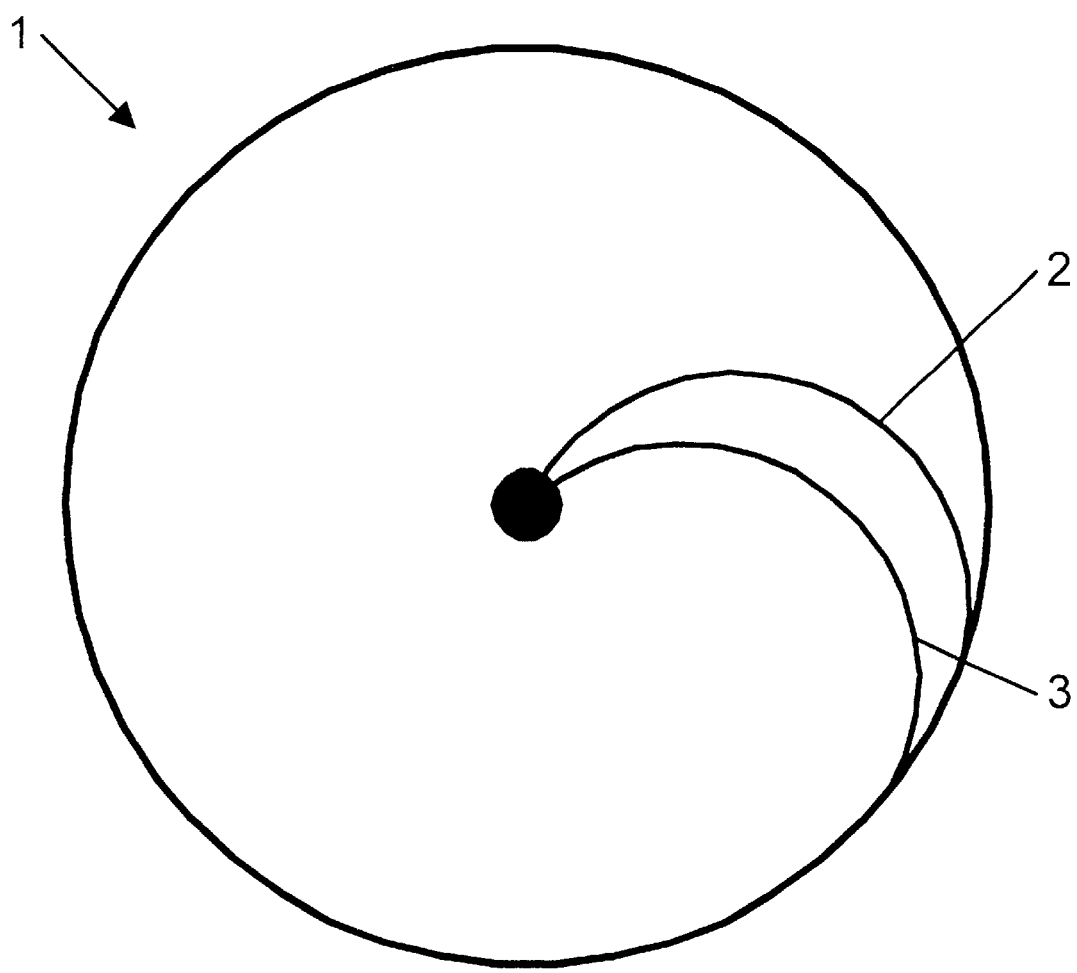
FIG. 1 is a schematic view of an optical recording disk master according to the principles of the invention.

FIG. 1 is a schematic view of an optical recording disk master 1 having curved spoked sectors 2 and 3 embossed onto it, producing a "hard format" that cannot be modified by the optical recording apparatus 4. The exact nature of the optical recording technique, i.e., whether it is read only, write once, rewritable, magneto-optic, far-field, near-field, etc., is not critical to the scope of the invention. Nor is the exact shape of the curved spoked sectors 2 and 3 critical to the scope of the invention, only that they are curved. The particular curve shown in FIG. 1 is smooth and continuous, but this is only an example. Compound curves, including those having discontinuities as the curve is considered in a radial direction, could be employed. Also, for convenience of illustration only, two curved spokes 2 and 3 are shown, although the standard commercial practice is to populate the entire surface of disk master 1 with a large number of identically shaped spokes.

Spoke-shaped sectors 2 and 3 are commonly produced by embossing master disk 1 with a pattern of features generated by a data stream. This produces a series of features on the master disk, ie., the width of the spoke (which is not shown in detail in the scale of FIG. 1), comprises features that represent a digitally encoded physical version of the data stream.

Figure 2:
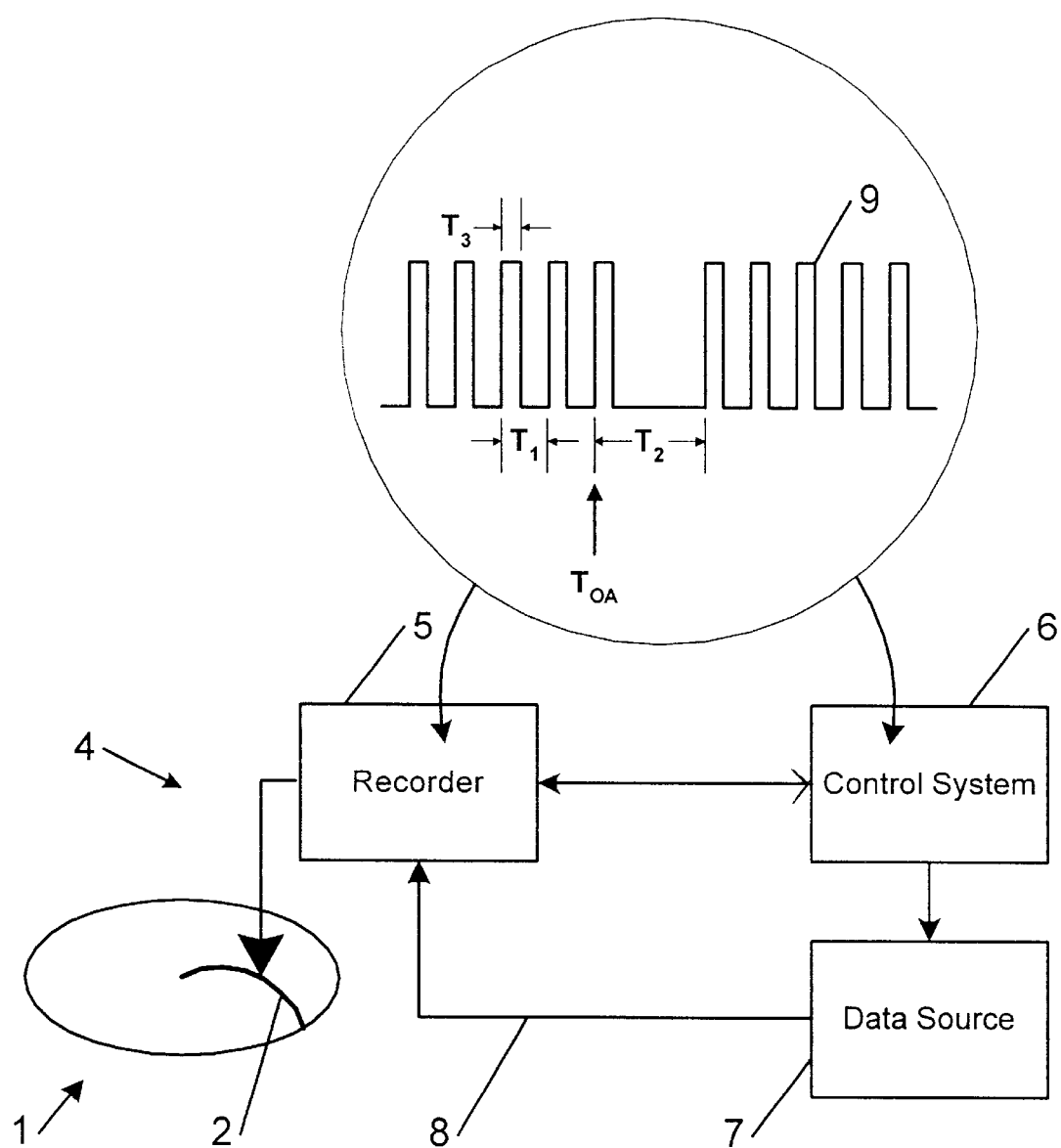
FIG. 2 is a schematic diagram of a system for the manufacture of the master of FIG. 1.

FIG. 2 is a schematic diagram of a system for the manufacture of the master of FIG. 1. A mastering system 4 comprises a recorder 5, a control system 6, and a data source 7. Data source 7 generates a stream of digital bits in the form of data signal 8, according to the principles of this invention. Data signal 8 is sent to the recorder 5 as directed by the control system 6, and thus recorder 5 produces features located at varying radial positions on the master disk 1 according to the information contained within data signal 8. A clock signal 9 synchronizes the data signal 8 with rotation of the master disk 1. The clock signal 9 may operate through control system 6 and data source 7, or directly through recorder 5, depending on the embodiment of the invention as discussed in more detail below.

In the broadest embodiment of the invention, data signal 8, unlike the practice of the prior art, is not a constant-phase signal during the entire mastering process performed by mastering system 4, i.e., during the entire time required to emboss an entire master disk 1. Instead, the introduction of a variable delay between data signal 8 and rotation of master disk 1 is produced by a clock signal 9. The duration of the delay varies with the radial position on the disk for which the sector format data is intended. Thus, as illustrated in FIG. 2, a delay is introduced in clock signal 9. The delay can be changed once per revolution (i.e., at the "once around" time point $T_{OA}$). The delay is varied with radius, such that time period $T_2$ is (in general) different than time period $T_1$, provided that the period of the clock signal 9 must be preserved even though the total delay time required in clock signal 9 to achieve any given sector format shape may be longer than the period of the clock signal 9. If the delay is increased, $T_2$ is greater than $T_1$ (as illustrated in FIG. 2). If the delay is decreased, $T_2$ is less than $T_1$, and if it is constant, $T_2$ equals $T_1$.

One way to implement the invention is to slow down the clock such that its period is always greater than the total delay time. While this approach is within the scope of the invention, it is not preferred for commercially viable data recording systems because of the large, order-of-magnitude disparities between their clock periods (typically on the order of 0.4 milliseconds) and the delay times needed (typically on the order of 4 milliseconds).

Another way to implement the invention is to use digital delay lines, which preserve the period of an input waveform and still produce a delay greater than the period of the waveform. However, the maximum delay available in commercially available digital delay line chips is currently on the order of a few nanoseconds to only several hundred nanoseconds each. Thus, to achieve delays on the order of milliseconds requires hundreds if not thousands of such chips connected in series, and each individual chip requires individual programming to ensure that they all work together. The cost and time required to assemble and program these components is not commercially feasible at this time, although an embodiment employing them is within the scope of the invention.

Figure 3:
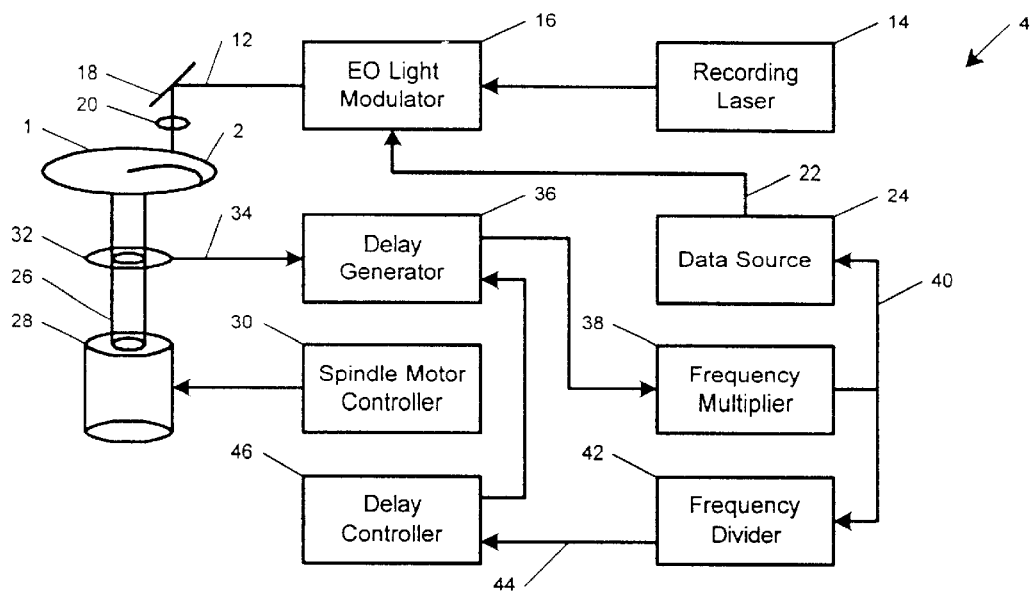
FIGS. 3 and 4 are schematic views of two specific preferred embodiments of the invention.
Figure 4:
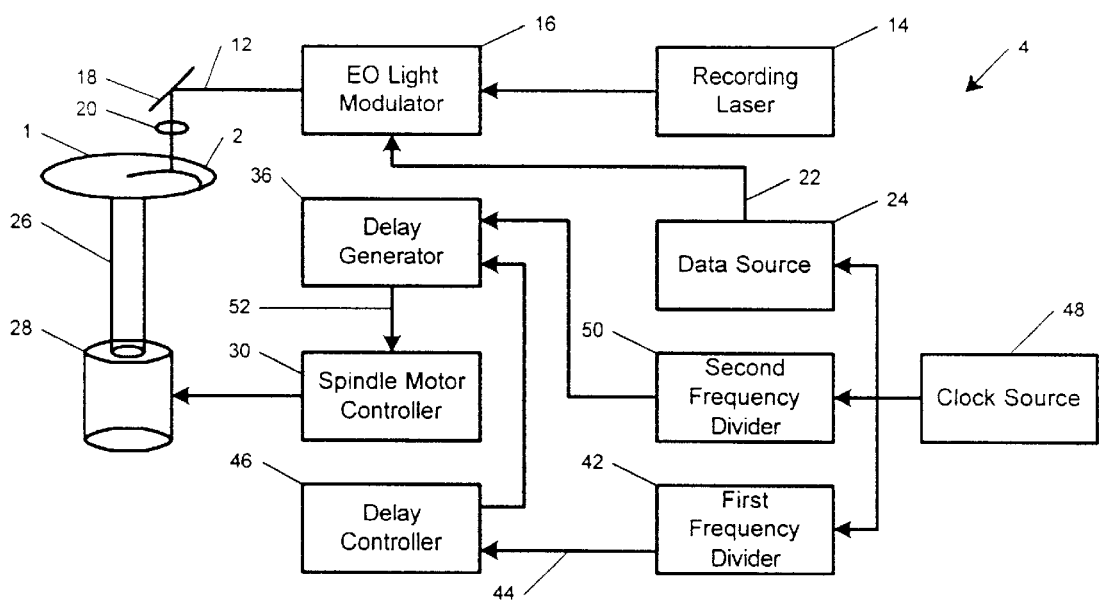

FIGS. 3 and 4 are schematic views of two specific preferred embodiments of the invention, each of which has elements common to both embodiments that will be described only once. The embodiment of FIG. 4 is preferred over the embodiment of FIG. 3 for commercial reasons unrelated to the scope of the invention.

Common to both embodiments are a method and system for generating a highly accurate (i.e., within approximately 50 to 100 picoseconds), variable time delay between the rotation of a master recording spindle and the recording of sector header data on a master disk. Thus, when the master is used to repeatedly replicate curved features into mass-produced optical recording disks, maximum spatial accuracy and resultant maximal timing accuracy occur during operation of the optical disk in an appropriately configured optical disk drive.

Each embodiment depicts how arc-shaped header spoke patterns (not shown and not critical in their details to the scope of the invention) may be generated on an optical disk master 1 by modulating a light beam 12 produced by a laser 14 with an electro-optic modulator 16 prior to directing light beam 12 onto master 1, using an optional but conventional mirror 18 and a focusing lens 20. The modulator 16 responds to an incoming data signal 22 generated by a data source 24. The master 1 is mounted on a spindle 26 so that it can be rotated by spindle motor 28, which in turn is driven by spindle motor controller 30. The use of this conventional method of embossing is preferred but not required for the practice of the invention. The broadest scope of the invention includes any means for embossing a pattern onto the master disk 1 that otherwise operates in accordance with the principles of the invention as described below.

In the embodiment of FIG. 3 only, the spindle motor also preferably supports a "tach" disk 32 that is mounted on the spindle to rotate at the same speed as spindle 26 and master 1. Tach disk 32 generates a tach signal 34, which in turn can be used to determine the exact rotational velocity of the master 1 according to techniques known in the art. The use of a tach disk 32 is preferred but not required for the practice of the invention. The broadest scope of the invention includes any means for determining the rotational velocity of the master disk 1. In this embodiment, the tach signal 34 is the clock signal 9 of FIG. 2.

The tach signal 34 is an input to a delay generator 36, which in turn supplies a signal to a frequency multiplier 38. The output of frequency multiplier 38 is a data clock signal 40 that is an input to data source 24 and a frequency divider 42. The frequency divider 42 in turn provides an input in the form of a once-around index signal 44 to a delay controller 46. The delay controller 46 in turn provides an input to the delay generator 36.

In the most preferred embodiment of delay generator 36, the rising edge of the input waveform triggers the delay, and the output is a pulse of programmable pulse width having a leading edge that has been delayed by the desired amount of time. The use of non-retriggerable one-shot circuitry is possible and preferred for its simplicity, but it does have the disadvantage that delay generator 36 would not then create a delay longer than the period of the input waveform without missing some of the triggers from that input waveform. This limitation is avoided by cascading multiple generators in series, thus providing enough generators to delay the signal by the required amount without any single generator needing to produce a delay longer than the period of the input waveform.

In operation, the rotational phase of the spindle 26 is kept constant and the phase of the recorded data is varied with respect to the rotational phase. An internal frequency reference in the spindle motor controller 30 is the preferred technique for keeping the rotational phase of the spindle 26 constant. A variable time delay generator 36 delays tach signal 34. The delayed tach signal frequency is multiplied up to the data recording frequency by the frequency multiplier 38. The phase of the resulting data clock signal 40 is varied by the varying time delay and causes the data modulated into light beam 12 to be recorded on the master disk 1 with the required arced spatial pattern.

Variation of the time delay is controlled by the delay controller 46, which updates the delay at a certain rate. For maximum accuracy, the preferred rate is once per spindle revolution, based on the once-around index signal 44, which is derived from the data clock using frequency divider 42. Thus, the delay updates are synchronized with the data, which allows changes in the data clock delays to occur between times when the data is written (in burst mode). This prevents data timing distortions that would occur if the time delay were updated within a data burst. The magnitude of the delay is calculated by the delay controller 46 according to any convenient mathematical algorithm that defines the shape of the arc pattern as a function of recording radius.

In the embodiment of FIG. 4 only, an external clock source 48 provides an input to the data source 24 and a first frequency divider that corresponds to frequency divider 42 of FIG. 3, and also a second frequency divider 50. As before, the first frequency divider 42 provides an index signal 44 to the delay controller 46. As in the previous embodiment of FIG. 3, the delay controller 46 provides an input to the delay generator 36. Another input to the delay generator 36 comes from the second frequency divider 50. The output of the delay generator 36 is an external reference clock signal 52 that spindle motor controller 30 uses to control the rotational speed of spindle motor 28. In this embodiment, the clock signal 52 is the clock signal 9 of FIG. 2.

In operation, the phase of the recorded data is held constant and the rotational phase of the spindle 26 is varied with respect to the data phase. The phase of the recorded data modulated on signal 12 is maintained constant by the high accuracy reference clock source 48. The clock source 48 is divided by the second frequency divider 50 to produce an external reference clock to which the rotation of the spindle 26 is locked. The variable delay generator 36 varies the phase of this clock. The varying reference clock phase results in a varying spindle rotational phase, which causes the data to be recorded with the required arced pattern. As in the embodiment of FIG. 3, the magnitude of the time delay is calculated by the delay controller 46 according to any convenient mathematical algorithm that defines the shape of the arc pattern as a function of recording radius.

Considering the preferred embodiments of FIGS. 3 and 4 together, it is clear that a general expression of the invention may be made in terms of a relative variation between the phase of the recorded data and the rotational phase of spindle 26, keeping one of the two phases constant. If the phase of the data is varied relative to the rotational phase of spindle 26, keeping the latter constant, one obtains an embodiment of the general type that includes the preferred embodiment of FIG. 3. If the rotational phase of the recording spindle 26 is varied relative to the phase of the data, keeping the latter constant, one obtains the general type that includes the preferred embodiment of FIG. 4. Neither embodiment is limited to the exact configuration of equipment used to implement the embodiment. Commercially available equipment within the knowledge and skill of the art may be employed.

Either embodiment of the invention provides enormous flexibility in manufacturing master disks for any of a set of multiple shapes of curved arced formats from a single apparatus. Similarly, the scope of the invention also includes an embodiment in which the phases of both the data and the rotation of the spindle could be varied relative to each other (keeping one constant in any specific situation), depending on the circumstances.

In each of the embodiments of FIGS. 3 and 4, the process of forming the arc-shaped sector header requires that the period of the clock signal be preserved. The delay may be longer than the period of the clock signal. The delay settable in a delay generator is limited to a time less than one period of the input signal. Therefore, to produce the delay time greater than one period, each of these embodiments of the invention preferably uses multiple delay generators connected in series, with the output of each generator (other than the final generator) connected to the input of the next adjacent generator.

Figure 5:
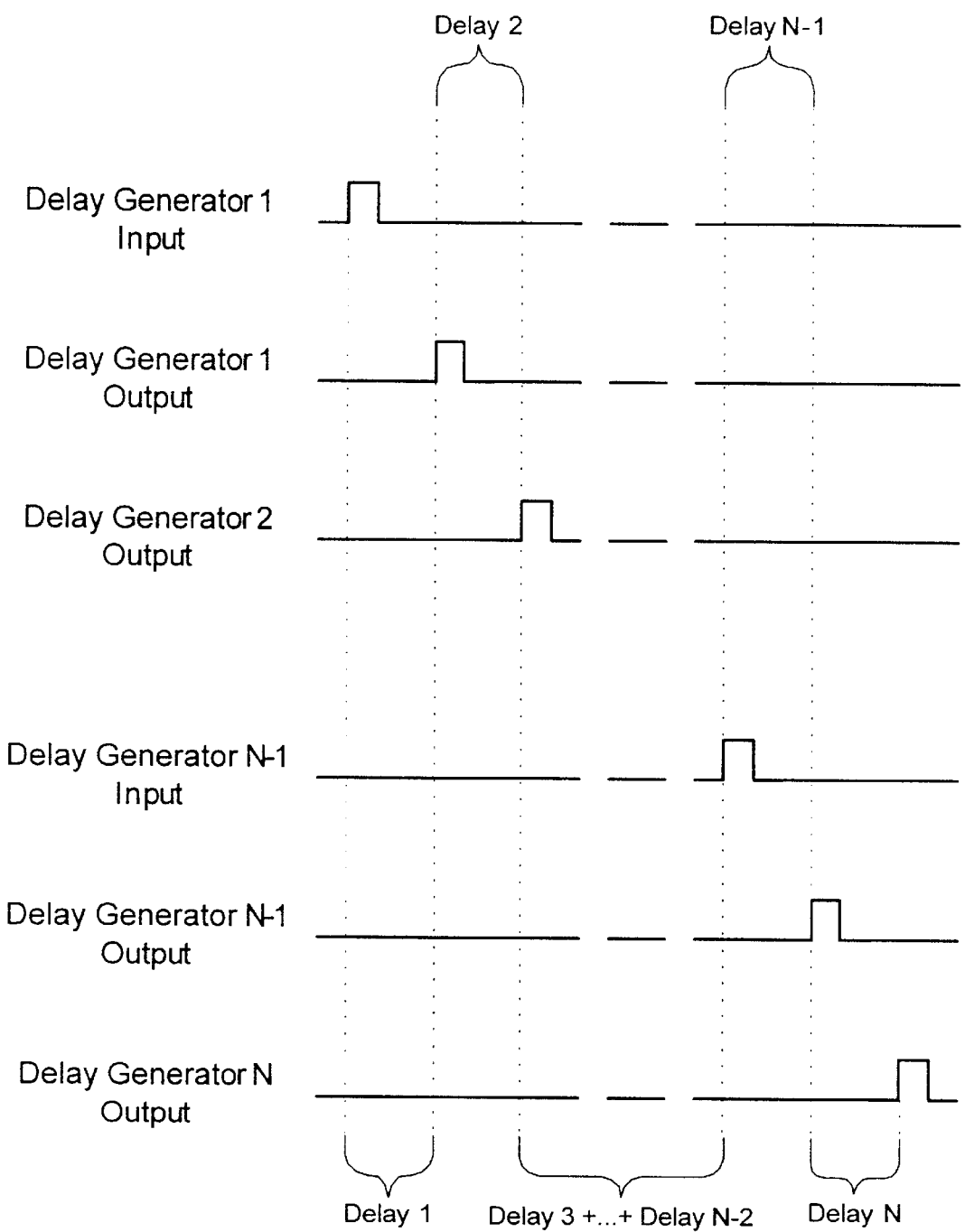
FIG. 5 is a timing diagram indicating a feature of the invention.

This is illustrated schematically in the timing diagram of FIG. 5. A series of n delay generators, each providing an amount of delay no greater than a maximum delay period, produces a total delay equal to the sum of the delays produced by the individual generators. In general, the number of delay generators required is equal to the ratio of the maximum delay required to the period of the clock signal, rounded up to the nearest integer. It may be preferable in some implementations for the denominator to equal the clock period minus the sum of the pulse width of the delayed waveform and a relatively small amount. The small amount is to prevent the delay time from becoming too close in value to the period of the input waveform. The delay generator pulse width and the small amount would be chosen to compensate for inherent jitter and other characteristics of the recording system.

We claim:

1. A method of forming an arced sector header on a rotating master recording disk, using a data stream and clock signal, in which the data stream has a phase and the rotating master disk has a rotational phase, comprising introducing into the clock signal a variable delay that preserves the period of the clock signal to create a relative variation between the phase of the data stream and the rotational phase of the rotating master disk while holding one of the phases constant.

2. The method of claim 1, in which the phase of the data stream is held constant.

3. The method of claim 1, which the rotational phase of the rotating master recording disk is held constant.

4. The method of claim 1, further comprising using at least one delay generator to introduce the variable delay into the clock signal.

5. The method of claim 4, in which any delay generator comprises at least one digital delay line.

6. The method of claim 5, in which any delay generator comprises at least two digital delay lines connected in series.

7. The method of claim 4, Further comprising connecting in series all of at least one non-final and one final delay generator, such an output of each non-final delay generator is connected to an input of a next adjacent delay generator.

8. The method of claim 4, further comprising using a series of N delay generators, each providing an amount of delay no greater than a maximum delay period, to produce a total delay equal to the sum of the delays produced by the individual generators.

9. The method of claim 4, further comprising using a quantity of delay generators equal to a ratio of a maximum delay required to a period of the clock signal, rounded up to the nearest integer.

10. A method of using a data stream to form arced sector header shapes on rotating master recording disks, and a clock signal having a variable delay that corresponds to a specific sector header shape and that preserves the period of the clock signal comprising:

modulating a laser light beam by the data stream in response to an incoming data signal generated by data source, vary the rotational phase of the rotating master based on the clock signal to create a relative variation between the phase of the data stream and the rotational phase of the rotating master recording disk, and holding the phase of the data stream constant for each arced sector header shape.

11. A system for forming an arced sector header on a rotating master recording disk using a data stream and a clock signal, the system comprising:

a data source generate a data stream;

a spindle motor controller to control rotation of a master recording disk; and a delay generator to introduce into a clock signal a variable delay that preserves the period of the clock signal, wherein the data stream modulates a laser light beam, and the delay generator provides the variablye delayed clock signal one of the data source and the spindle motor controller to cause a relative variation between a phase of the data stream and a rotational phase of the rotating master while one of the phases is held constant.

12. The system of claim 11, in which the phase of the data stream is held constant.

13. The system of claim 11, in which the rotational phase of the rotating master recording disk is held constant.

14. The system of claim 13, in which the system further comprises means for determining the rotational velocity of the master recording disk.

15. The system of claim 14, in which the means for determining the rotational velocity comprises means for generating a tach signal from actual rotation of the master recording disk.

16. The system of claim 15, further comprising an internal frequency reference that is used to keep the rotational phase of the master recording disk constant.

17. The system of claim 11, further comprising at least one delay generator that introduces a variable delay into the clock signal.

18. The system of claim 17, in which any delay generator comprises at least one digital delay line.

19. The system of claim 18, in which any delay generator comprises at least two digital delay lines connected in series.

20. The system of claim 17, further comprising at least one non-final, and one final, delay generator, such that all delay generators are connected in series with the output of each non-final delay generator connected to an input of a next adjacent delay generator.

21. The system of claim 17, in which a series of N delay generators, each providing an amount of delay no greater than a maximum delay period, produces a total delay equal to the sum of the delays produced by the individual generators.

22. The system of claim 17, in which there is a quantity of delay generators equal to a ratio of the maximum delay required to the period of the clock signal, rounded up to the nearest integer.

23. A system for using a data stream to form arced sector header shapes on rotation master recording disk, in which the data stream has a phase and the rotating master disk has a rotational phase, comprising a dock signal having a variable delay that corresponds to a specific sector header shape and that preserves the period of the clock signal, and in which the data stream modulates a laser light beam in response to an incoming data signal generated by a data source, and the variable delay of the clock signal causes the rotational phase of the rotating master to vary such that there is a relative variation between the phase of the data stream and the rotational phase of the rotating master recording disk, provided the phase of the data stream is held constant for arced sector header shape.

* * * * *